Jan. 21, 1958  A. DRAKOFF  2,820,513
SCREEN COVERING FOR FRYING PANS AND THE LIKE
Filed Oct. 18, 1955  3 Sheets-Sheet 1
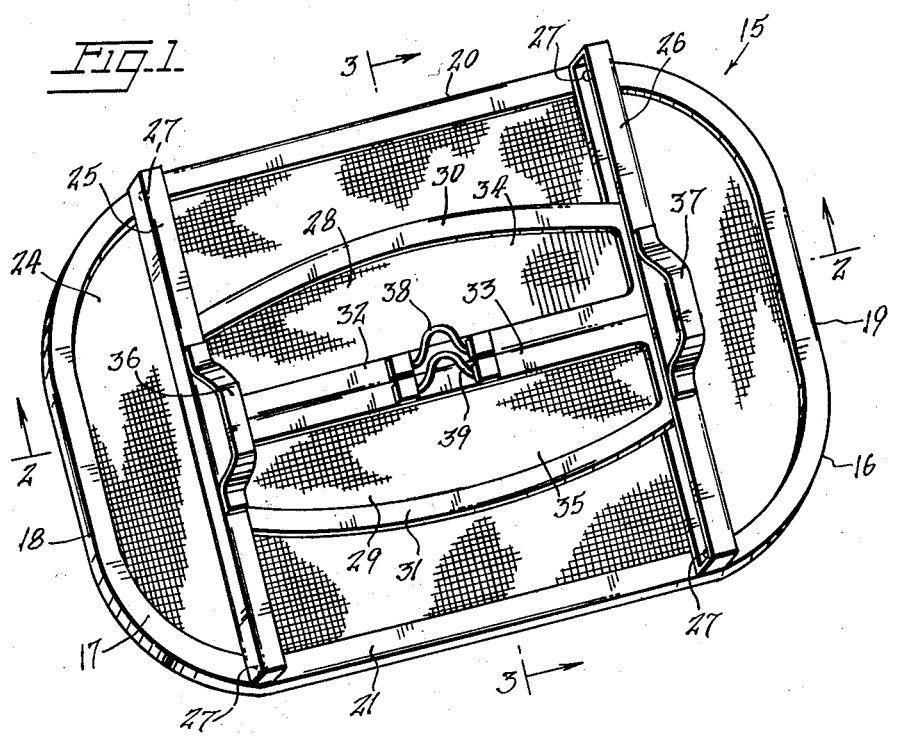
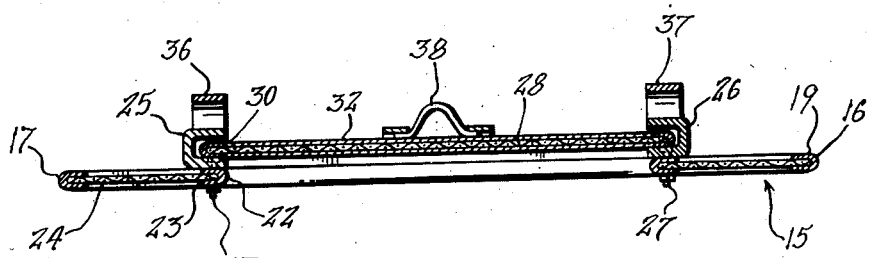
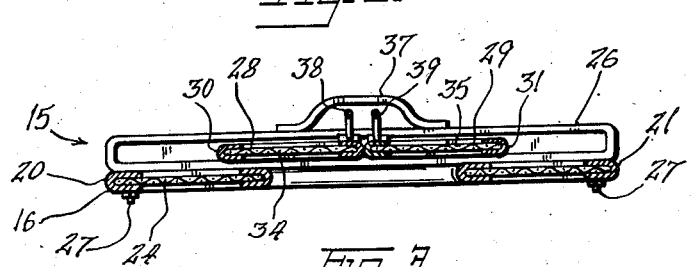
INVENTOR.
ANIELA DRAKOFF

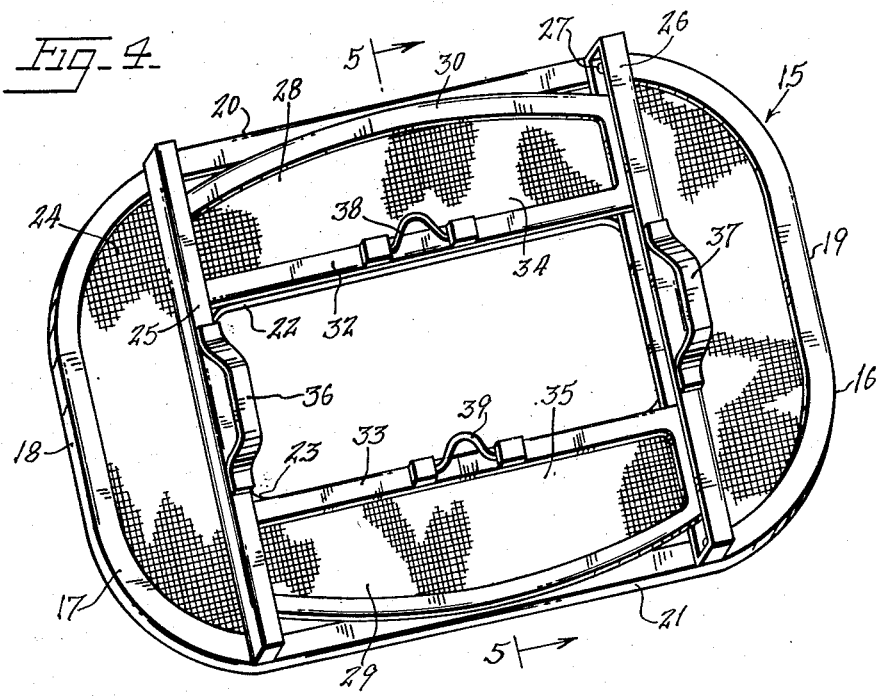
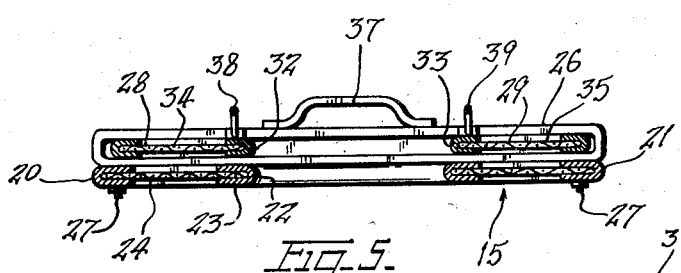
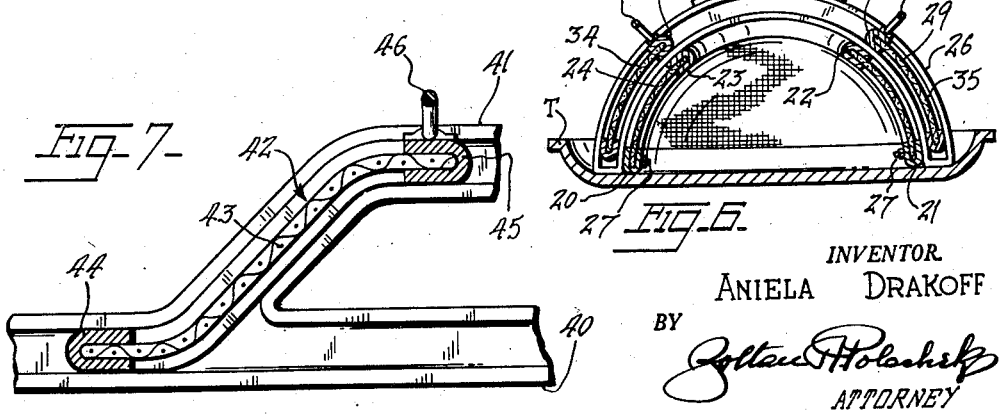

Jan. 21, 1958 A. DRAKOFF 2,820,513
SCREEN COVERING FOR FRYING PANS AND THE LIKE
Filed Oct. 18, 1955 3 Sheets-Sheet 3
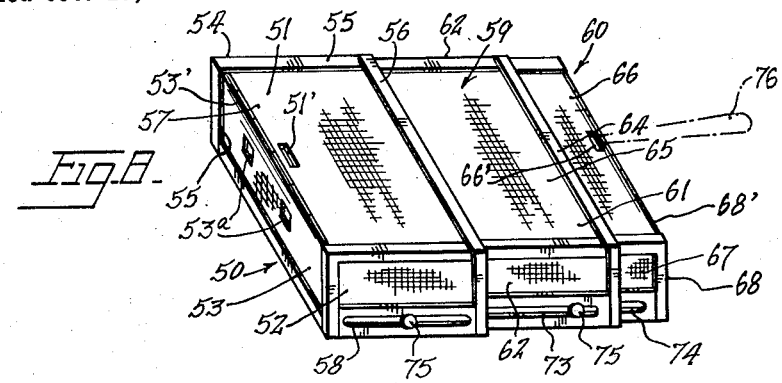
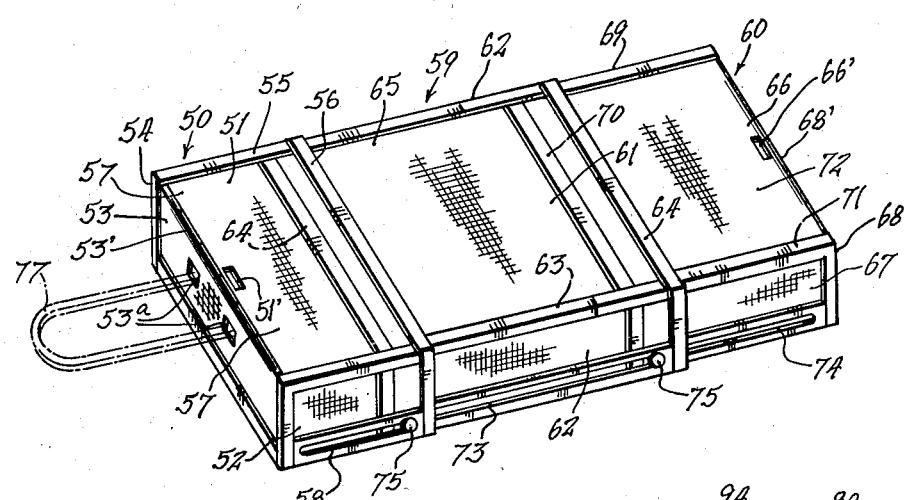
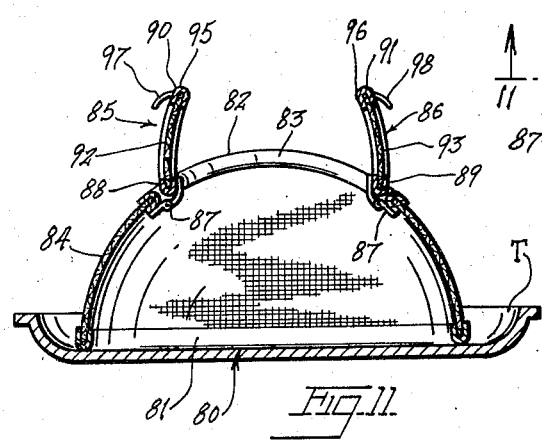
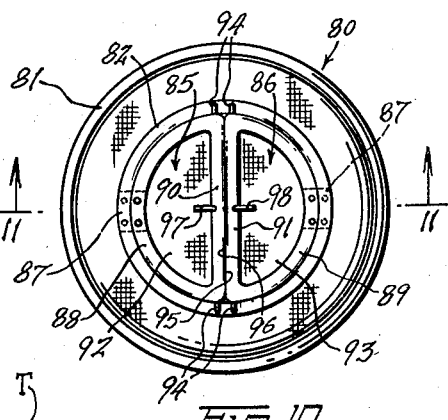
INVENTOR.
ANIELA DRAKOFF
BY
*Zoltan Holcheck*
ATTORNEY

United States Patent Office

2,820,513
SCREEN COVERING FOR FRYING PANS AND THE LIKE

Aniela Drakoff, Hartford, Conn.

Application October 18, 1955, Serial No. 541,138

1 Claim. (Cl. 160—180)

This invention relates to new and useful improvements in covers or lids for cooking pots and pans.

More particularly, the present invention proposes the construction of an improved screen cover for cooking pots and pans which can easily and quickly be put on and removed and which will permit safe access to the pot or pan contents during cooking without removal of the cover.

As a further object, the present invention proposes to provide a screen cover for cooking pots and pans having screen door members which can conveniently be moved and which when in place will serve to hold in cooking flavors as well as to protect the user of the pot or pan during the cooking process.

A further object of the invention proposes constructing the cover with handles both for the cover and for the doors which will permit safe lifting of the cover or opening of the doors.

A still further object of the invention proposes forming the cover with slidable screen elements for extending or contracting the cover to fit any size pan or pot desired.

Another object of the invention proposes constructing the screen cover with means to hold the door members in an elevated position over the opening in the frame.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a screen cover for pots and pans constructed and arranged in accordance with the present invention and is shown in flat condition.

Fig. 2 is a sectional view taken on line 2—2 of Fig. 1.

Fig. 3 is a sectional view taken on line 3—3 of Fig. 1.

Fig. 4 is a view similar to Fig. 1 but showing the doors or door members open.

Fig. 5 is a sectional view taken on line 5—5 of Fig. 4.

Fig. 6 is a similar view to Fig. 5, showing the screen cover in rounded condition, in use over a roasting or broiling tray.

Fig. 7 is a fragmentary view similar to Fig. 3 but illustrating a modification of the present invention.

Fig. 8 is a view similar to Fig. 1 but illustrating another modification of the present invention.

Fig. 9 is a view similar to Fig. 8 but with the structure in full open or extended position.

Fig. 10 is a view similar to Fig. 1 but illustrating still another modification of the present invention.

Fig. 11 is a sectional view taken on line 11—11 of Fig. 10 but showing the doors or door members open.

The screen cover, in accordance with the first form of the invention, is illustrated in Figs. 1 to 6, inclusive, and is designated generally by the reference numeral 15, prevents spattering of the fat and soiling the oven.

It also keeps insects out of the food in the pots, pans and trays and keeps the food in more sanitary condition.

Cover 15 is rectangular in shape as illustrated and has a frame 16 with a peripheral binding 17 extending around the ends 18 and 19 and around the sides 20 and 21. The frame 16 has a central opening 22 which, as shown, is also rectangular in shape and is bounded by an inner binding 23. Between the peripheral binding 17 and the inner binding 23 is fine mesh screen 24.

A pair of spaced door tracks 25 and 26 are mounted on the frame by bolts 27 crosswise of the frame at the ends of the frames and adjacent the central opening 22.

Slidably mounted in the tracks 25 and 26 are door members 28 and 29 the width of each of which is the same or slightly less than the distance between the central opening 22 and the sides 20 and 21 of the frame. Door members 28 and 29 have peripheral bindings 30 and 31 and inner bindings 32 and 33, respectively, with fine mesh screen 34 and 35 between the bindings.

Spaced handles 36 and 37 are secured to the tracks 25 and 26 for lifting and lowering the cover, and handles 38 and 39 are pivotally secured to the door members 28 and 29 for sliding the doors together and apart. The arched screen cover 15 is in use over a roasting or broiling tray in Fig. 6.

The modification of the invention illustrated in Fig. 7 is characterized by the provision of a pair of door tracks 40 (only one being shown) having a raised central switch portion 41 for a door member 42 to slide into. The switch portion 41 serves not only as a handle for the cover to which the tract is secured, but also serves to keep elevated above a frame opening the door member 42. The door member 42 is constructed the same as door members 28 and 29, having fine mesh screen 43 with peripheral and inner bindings 44 and 45 and a handle 46.

The modification of the invention illustrated in Figs. 8 and 9 is characterized by the provision of a frame 50 having a top 51, and two side portions 52 and 54, and an end portion 53 hinged at 53'. The frame 50 also has a peripheral binding 55 and an inner binding 56 with fine mesh screen 57 between. Frame 50 has a pair of spaced slotted tracks 58 disposed on opposed side portions 52 and 54.

A pair of door members 59 and 60 are provided slidably to nest together and in the frame 50. Door member 59 has a top portion 61 and side portions 62 and peripheral and inner bindings 63 and 64 with fine mesh screen 65 between.

Door member 60 has a top portion 66, two side portions 67, 69, and an end portion 68 which may be lifted on hinge 68' to see the condition of the food. The door member 60 is also provided with peripheral and inner bindings 70 and 71 with fine mesh screen 72 between. Door members 59 and 60 also have spaced slotted tracks 73 and 74 on opposed side portions and slide pins 75 hold the door members and the frame slidable together so that the cover can be extended as shown in Fig. 9 or contracted as shown in Fig. 8.

The top portions 51 and 66 are provided with suitable openings 51' and 66' adapted to be engaged by a handle member 76 for sliding the frame 50 and the door members 59 and 60. The end members 53 and 68 are also provided with suitable openings 53a adapted to be engaged by a U-shaped handle member 77 for turning the end members 53 and 68 on their respective hinges 53' and 68'.

The modification of the invention illustrated in Figs. 10 and 11 is characterized by the provision of a frame 80 having a peripheral binding 81 shown resting on a tray T, and an inner binding 82 around a central opening 83. Fine mesh screen 84 is disposed between the bindings 81 and 82. A pair of door members 85 and 86 are secured each at one side by hinges 87 to the frame to overlie the central opening 83. Door members 85 and 86 have peripheral bindings 88 and 89 and inner bindings 90 and 91 with fine mesh screen 92 and 93 between. The hinges 87 secure the door members 85 and 86 to the frame in clamshell fashion as double doors.

Bearing pins 94 are secured to the door members 85 and 86 at their free opposed edges 95 and 96 to hold these edges together over the central opening of the frame. Handles 97 and 98 are secured to the doors to open the doors and to serve as rests for the doors when the doors are open and folded back.

It is to be understood this sanitary screen cover may also be made of a sheet metal with suitable small perforations to cover the food to be roasted and to prevent the spattering of fat and thus to soil the oven. This cover also prevents insects from coming in contact with the food, when the device is used outdoors or indoors and permits inspection of the food while being roasted, without removing the entire screen cover, furthermore the sliding cover provides a more convenient opening and closing means.

This sanitary screen cover may be made of any suitable material, shape and size.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new and desire to secure by United States Letters Patent is:

A portable screen cover for cooking pots and pans comprising a frame having a peripheral binding and inner bindings with fine mesh screen therebetween, a plurality of like door members each with a peripheral binding, with fine mesh screen within the bindings, said frame having a central opening and said inner binding on the frame being around the central opening, a pair of spaced tracks U-shaped in cross-section mounted on the frame adjacent the central opening and at opposite ends of said opening, the ends of said door members being slidably mounted on the tracks, said frame being rectangular in shape and said central opening being of like shape, said tracks being disposed crosswise of the frame at the ends of the central opening and said doors being of a width equal to the distance between the central opening and the sides of the frame, a pair of door handles pivotally mounted on the door members for sliding the door members together and apart over and from the central opening of the frame in the tracks on the frame, and a pair of handles on the tracks for manipulating the cover.

References Cited in the file of this patent

UNITED STATES PATENTS

| | | |
|---|---|---|
| 237,983 | Kenworthy | Feb. 2, 1881 |
| 455,803 | Stegemann | July 14, 1891 |
| 589,229 | Strack | Aug. 31, 1897 |
| 704,992 | Warner | July 15, 1902 |
| 968,028 | Brown | Aug. 23, 1910 |
| 1,431,745 | Lang | Oct. 10, 1922 |
| 1,684,027 | Hinman | Sept. 11, 1928 |
| 2,498,534 | Drum | Feb. 21, 1950 |